United States Patent [19]
Freeman

[11] Patent Number: 5,969,078
[45] Date of Patent: Oct. 19, 1999

[54] COMPOSITIONS AND METHODS FOR A PROTECTIVE SURFACE COATING USEFUL TO REPAIR DAMAGED SURFACES

[75] Inventor: John E. Freeman, Big Springs, Tex.

[73] Assignee: Freecom Inc., Big Spring, Tex.

[21] Appl. No.: 08/920,578

[22] Filed: Aug. 29, 1997

[51] Int. Cl.⁶ .................................................. C08G 59/18
[52] U.S. Cl. ............................................................ 528/87
[58] Field of Search ................................................ 528/87

[56] References Cited

U.S. PATENT DOCUMENTS

| | | | |
|---|---|---|---|
| 4,775,728 | 10/1988 | Goel ........................................ | 525/523 |
| 4,789,567 | 12/1988 | Freeman et al. ........................ | 427/410 |
| 4,968,538 | 11/1990 | Freeman et al. ........................ | 427/410 |

FOREIGN PATENT DOCUMENTS

| | | |
|---|---|---|
| 245021 | 11/1987 | European Pat. Off. . |
| 2639365 | 2/1994 | France . |
| 2714593 | 10/1978 | Germany . |
| 60-104173 | 6/1985 | Japan . |
| 5-079185 | 3/1993 | Japan . |
| 2225323 | 5/1990 | United Kingdom . |

OTHER PUBLICATIONS

Freecom News Newletter, vol. 5 Issue 1, Mar. 1997.
Freecom, Inc. Brochure; "CeRam–Kote 54, The Flexible Ceramic", Feb. 10, 1997.
Freecom, Inc. Technical Data Booklet; "CeRam–Kote 54, The Flexible Ceramic", Jan. 10, 1997.
Freecom News Newsletter, vol. 3 Issue 5, Jun./Jul. 1995.
Zeelan Industries, Inc. Brochure; "Zeeospheres", 1993.
Freecom, Inc. Product Information Booklet; "CeRam–Kote 54", Dec. 1991.
W. R. Grace & Co. Material Safety Data Sheet: "Syloid 74/Syloid 74FP"; Mar. 29, 1985.
Cabot Corporation Technical Data Sheet: "Cab–O–Sil"; Aug. 1983.

*Primary Examiner*—Erma Cameron
*Attorney, Agent, or Firm*—The Matthews Firm

[57] ABSTRACT

A high performance protecting surface coating suitable for repairing damaged surfaces, and methods, is disclosed. The coating comprises a resin such as epoxy loaded with inert particles, preferably ceramic, and a curing agent for hardening. The coating of the present invention does not run or sag when applied to a substantially vertical surface.

6 Claims, No Drawings

COMPOSITIONS AND METHODS FOR A PROTECTIVE SURFACE COATING USEFUL TO REPAIR DAMAGED SURFACES

FIELD OF THE INVENTION

This invention relates generally to protective coatings and paints. More particularly this invention pertains to a coating system providing a tough wear and corrosion resistant material having extremely high adhesion to various metal, concrete, composite, or plastic substrates. Additionally, the coating of the present invention is useful as a grouting or putty material to repair holes, cracks, pits, and other non-uniformities on damaged or discontinuous surfaces.

BACKGROUND OF THE INVENTION

Protective coatings are often used on many mechanical or protective surfaces to prevent corrosion, abrasion, and other wear on the surface. High performance coatings have been developed which exhibit high resistance to abrasion, corrosion, impact, and other characteristics of high performance. These coatings include powder comprising finally divided inert particles dispersed in a resin which is then mixed with a hardening catalyst and applied. The coating of the present invention is also useful for repairing damaged surfaces similar to a grout or putty material.

The resin of the present coating should be selected for its wear resistant properties and by the strength of its adhesion to the surface being protected. Some commonly used resins include epoxy (e.g., Bisphenol A and Bisphenol F based epoxies), polyester, vinyl-ester, phenolic, novolac (phenol/novolac), and polyglycol resin. Epoxy resins are known to those skilled in the art to have the highest adhesion values of all resins. The preferred resin of the present invention is Bisphenol F epoxy because it does not require any solvent to liquify the resin prior to loading with ceramic particles.

The adhesion strength of coatings is measured according to an international industry standard referred to as American Standard Testing Materials (ASTM). ASTM adhesion testing involves applying and curing a coating on to a surface substrate prepared according to National Association of Corrosion Engineers (NACE) specifications. For example, a steel test panel prepared to an anchor profile of 1 mil to 2½ mils (white to near white metal) and cleaned of substantially all contaminates. The coating is applied and cured at room temperature (72° F.). Adhesion is tested according to ASTM protocol by pulling on the cured coating and measuring the force required to pull the coating of the surface. Adhesion is measured under ASTM protocol in metric units known as Megapascals (Mpa). For convenience, Mpa's are often converted herein to approximate English units of pounds per square inch (psi).

In addition, or alternatively to ASTM testing, adhesion may also be measured by resistance to hydroblasting, i.e., measuring the force (in psi) of a pressurized stream of water to dislodge a coating from a standard prepared surface. Typically, adhesion strengths are the same whether measured by ASTM pulling or hydroblasting. One drawback of ASTM testing is that the surface substrate may fail by mechanical breakage or some other means before the coating being tested fails.

Epoxy resins are known to those skilled in the art to have the highest adhesion strength of commonly available resins, epoxy having adhesion strength measured in the range of approximately 800 psi to 1,200 psi.

Phenol/novolac resins are thermoset plastic materials offering alternatives to Bisphenol A-based epoxies and Phenolic resins, particularly when formulators and fabricators seek good strength and good chemical resistance at high temperatures. Phenol/novolac epoxy combines in one molecule the stability of a phenolic backbone with the reactivity and versatility of an epoxy resin. The resulting resins have multi-epoxy functionality. The additional reactive sites, as compared to a Bisphenol A-type resin, produce tightly cross-linked cured systems with improved resistance to acids, bases, and solvents; retention of good mechanical properties at high temperatures; minimal shrinkage for accurate reproduction; acceptance of a wide range of modifiers, fillers, and pigments; and improved high temperature adhesive properties. The phenol/novolac resin is usually received from the manufacturer dissolved in 15% acetone by weight of phenol/novolac.

The resin carrying the inert particles must be mixed with an appropriate hardening catalyst to form a base composition before application. Generally both the resin and catalyst are supplied from the coating manufacturer with instructions as to mixing. A coating commercially available is manufactured by Owens-Corning and marketed under the name Owens-Corning Abrasion Resistant Coating (ARC). The Owens-Corning coating contains finally divided ceramic particles dispersed in an epoxy resin, and a compound that adds flexibility to the coating.

Another coating commercially available is manufactured by Freecom, Inc. under the name "Ceram-Kote 54". The Freecom product is sold with instructions that allow the user to dilute or thin the resin and catalyst mixture with an appropriate solvent to provide for ease of application and for various desired surface finishing and coating qualities.

To the base composition mixture various additives may be combined to greatly enhance the qualities of the final product. Such additives may include pigments for color and thixatropes to inhibit running and sagging, a variety of inert ceramic powers added to enhance the abrasion resistant capabilities of the coating. The coating of the present invention does not comprise any solvent or diluent. The present coating is all solids (resin is acknowledged in the art as a solid even though it is flowable prior to adding catalyst).

U.S. Pat. 4,789,567, issued Dec. 6, 1988, to Freeman, hereinafter referred to as the '567 patent, and which is incorporated herein by reference, discloses a protective coating of finely divided abrasions resistant inerts carried in a corrosion resistant epoxy resin that is diluted with a solvent and applied to a surface. The coatings of the '567 patent may be cured to achieve either a glossy or a mat finish. The '567 patent, however, does not disclose nor teach the performance characteristics of the coating of the present invention. Nor does the '567 patent teach the use of additives in the manufacture of the coating to achieve desired performance characteristics.

U.S. Pat. 4,968,538, issued Nov. 6, 1990, to Freemen, a continuation-in-part of the '567 patent, hereinafter referred to as the '538 patent, and which is incorporated herein by reference, discloses a protective coating of finely divided abrasion resistant inerts in a corrosion resistant epoxy resin diluted with a solvent, and further disclosed the addition of novolac resin dissolved in methyl-ethyl-ketone (MEK) and polyglycol di-epoxide resin to the epoxy resin carrying inert particles. The '538 patent and the '567 patent do not disclose nor teach the performance characteristics of the coating of the present invention. Nor does the '567 patent teach the use of additives in the manufacturer of the coating to achieve desired performance characteristics.

SUMMARY OF THE INVENTION

The coatings of the present invention comprises: a high performance surface coating useful for repairing damaged surfaces, the coating comprising:

at least one resin;

inert particles loaded into said resin; and a catalyst;

wherein said inert particle loaded resin and said catalyst combine to form a final coating composition having desired performance characteristics, said performance characteristics comprising adhesion strength of at least approximately 2,000 psi and impact resistance of at least 90-inch/lbs and wherein said final coating composition does not run or sag when applied to a substantially vertical surface.

The present invention also comprises a method of applying to a surface a high performance surface coating useful for repairing damaged surfaces, said coating comprising: at least one resin; inert particles loaded into said resin; a catalyst, wherein said inert particle loaded resin and said catalyst combine to form a final coating composition having desired performance characteristics, said performance characteristics comprising adhesion strength of at least approximately 2,000 psi and impact resistance of at least 90-inch/lbs and wherein said final coating composition does not run or sag when applied to a substantially vertical surface, the method comprising:

preparing said surface to achieve an appropriate anchor profile;

re-suspending all said inert particles loaded in said resin of said final coating composition;

applying said final coating composition to said surface; and curing said coating to achieve a desired finish.

The present invention further comprises a method of manufacturing a high performance surface coating useful for repairing damaged surfaces, the method comprising:

providing at least one resin;

providing an amount of inert particles;

loading said inert particles into said resin; and adding a catalyst to said inert particle loaded resin;

wherein said inert particle loaded resin and said catalyst combine to form a final coating composition having desired performance characteristics of said coating, said performance characteristics comprising adhesion strength of at least approximately 2,000 psi and wherein said final coating composition does not run or sag when applied to a substantially vertical surface.

The coating of the present invention is essentially all solids (resin and inert particles). An embodiment of the present invention comprises amounts of solid additives added to the mixture, such as powdered pigments, thixatropes (particulate thickeners), or inert particles such as ceramic powder.

The coatings of the present invention are very high performance, having extremely high adhesion to carbon steel, stainless steel, aluminum, titanium, fiberglass, composite materials, plastics, and concrete, and having very high resistance to abrasion and corrosion. The coatings of the present invention are flexible, machinable (when cured) and tolerate temperatures up to 300° F. (149° C.) with no deterioration of performance.

The coatings of the present invention comprise an inert particle loaded resin and a catalyst combined to form a base composition, together with any additives added to said base composition to achieve a final composition having desired performance characteristics.

To load the resin with inert particles such as ceramic, the selected resin should be of such viscosity that the resin may be stirred or mixed with sufficient vigor to incorporate the solids. Usually this is accomplished by warming the resin. The temperature of the resin for mixing in the inert solids depends on the resin selected. For example, a goo working temperature range for epoxy resin is in the range of approximately 100° F. to 120° F. Resins that start out more viscous than epoxy may require higher temperatures. The resins should not be warmed to such a temperature, however, as to effect the coating properties of the resin. The resin is stirred or mixed and the inert solids are added to the resin gradually and combined with the resin by the mixing action. The inert solid particles are added to the resin until the mixture is in the range of approximately 60% to 90% solids by weight of the mixture.

The coatings of the present invention are provided in two parts: the base, Part A, which is the inerts loaded resin composition, and a catalyst, Part B. The base is mechanically stirred until all inert particles are in suspension, before the catalyst (Part B) is added. For example, the base may be stirred with the use of a drill fitted with standard mixing blades submerged into the base composition. Mixing is renewed after catalyst addition until the batch is completely mixed. The standard ratio by volume is 8 measures of the base and one measure of the catalyst.

In some instances, proper preparation of the surface may be useful to achieve maximum performance of the coatings of the present invention. For example, it is recommended that steel surfaces to which the coating is to be applied be prepared to white or near white metal (SSP-10 or NACE-2) with a blast ink or pattern profile of 1 mil to 2½ mils maximum. 1 mil=25 angstroms. Aluminum requires only a light blasting or an alodine wash before coating. Polyester, epoxy and other plastics should be wiped with solvent and slightly roughen for better adherence. For best results, substrates must be clean and clear of contaminants.

The coatings of the present invention may be applied by any appropriate means. Due to the high viscosity of the present invention, however, the recommended means of application is with a putty knife, trowel, or other similar means. Curing by air at room temperature occurs within 6 hours to 8 hours for a standard finish. Curing may occur more rapidly or for different finishes by exposing the coating to elevated temperatures for varying periods of time.

The coating of the present invention has a pot life of about 1 hour at 72° F., and is cured in approximately 3 hours to 4 hours at 72° F.

DETAILED DESCRIPTION OF THE PREFERRED EMBODIMENT

In the preferred embodiment of the present invention, a loaded resin is prepared by loading a wear resistant resin with particles of inert solids. The inert particles may be in the form of irregularly shaped granules, spheres or platelets, depending upon the method of manufacturer, and may range in size from a few angstroms to several microns in size. Ceramic is the preferred inert, but any other abrasion resistant inert compound may be used.

To load the resin with the inert particles, the resin is stirred and inert solid particles are added gradually. The resin may need to be warmed first to achieve an adequate mixing viscosity. The temperature to which the resin is warmed will vary depending on the resin selected. For epoxy resin, for example, the epoxy is typically warmed to within approximately 100° F. to 120° F. In the preferred embodiment, the resin is mixed with a high speed disperser. The disperser usually comprises a shaft with a mixing blade at the mixing end of the shaft, wherein the blade comprises sharp points to facilitate shearing of the mixture, which results in more efficient dispersal of the components throughout the mixture. Particles are added to the resin until the mixture is in the range of approximately 60% to 90% inert solid particles by weight of the mixture. In the preferred embodiment, the range is n0 approximately 75% to 90% solids by weight. For purposes of the present invention, however, the precise ratio of resin to solids is less critical than the performance characteristics of the final coating composition.

In one embodiment phenol/novalac may be used as the resin. Phenol/novalac is solid in its pure form. The resin can be made fluid by adding a sufficient amount of 15% acetone to the phenol/novalac resin to achieve a composition of suitable consistency. In this formulation, Part A comprises about 92% solids (inerts and resin).

In the preferred embodiment, the selected resin is Bisphenol F. Bisphenol F resin does not require the addition of any solvent. The formulation of Part A in the preferred embodiment, therefore, is 100% solids (although it is not recommended for optimum performance of the present invention, the base composition may be diluted with a selected solvent additive such as acetone, isopropyl alcohol, methyl-ethyl-ketone (MEK), or both isopropanol and MEK).

An appropriate catalyst such as diethylene triamine or cycloaliphatic amine is added to the loaded resin to form a base composition and to initiate the curing process. For the preferred embodiment the ratio is approximately 8 to 10 measures of base to one measure of catalyst, depending on the temperature. For relatively cold temperatures (ambient or room temperature or colder) the preferred ratio is 8 to 1. For temperatures warmer than ambient temperature, the preferred ratio is 10 to 1.

Solid additives such as inert particles, thixatropes (such as silica—hydrophilic or hydrophobic), and pigments, for example, may be added to the base composition to form a final coating composition having desired performance characteristics. The performance characteristics of the preferred embodiment comprise adhesion strength of at least 2,000 psi and impact resistance of at least 90-inch/lbs, and the present coating does not run or sag when applied to a substantially vertical surface.

The high performance coating of the present invention has a surprisingly high adhesion strength, as measured by ASTM or hydroblasting, of at least 2,000 psi and impact resistance of at least 90-inch/lbs. This is stronger adhesion than is measured for ordinary epoxy.

The adhesion strength of the coatings of the present invention come from the high solids content of the coating. The high solids content, or "ceramic particle loading," produces low shrinkage during curing and results in lower stress levels in the cured coatings. Less shrinkage and lower stress yields a longer-lasting coating. Another factor that contributes to the bonding strength of the coatings of the present invention is that during curing, no by-products are formed, thus volatile agents are not generated to act as plasticizers.

The present invention comprises a higher inerts content in a resin than is achieved by those of ordinary skill in the art. The inert particles may be loaded into the resin of the present invention by any of a variety of mechanical means, including but not limited to, mixing, stirring, blending, folding, and the like.

In the present invention, inert particles are loaded into the resin to form a resin/inert particle mixture comprising finely divided inert particles in suspension in a resin, wherein the inert particles comprise at least approximately 60% of the weight of the mixture. In the preferred embodiment, the inert particles comprise from approximately 75% to approximately 90% of the weight of the mixture, wherein the mixture is comprised almost entirely of inert particles and just enough resin to coat each such particle with a thin film of resin.

The higher the content of inert particles in the present invention, the greater the wear resistance and overall toughness of the final coating composition. The ease of application of the present coating may diminish with increased content of inert particles.

While other coatings may offer resistance to specific classes of chemicals, the coatings of the present invention resist caustics as well as most acids, petroleum distillates and solvents. The coatings of the present invention also provide excellent electrical insulating characteristics (dielectric and resistive properties), and retain these properties under severe operating conditions. The coatings of the present invention are Volatile Organic Content (VOC) compliant. Since the preferred embodiment lacks any volatile solvent, the VOC rating of the coatings is essentially zero, which is well below the projected maximum VOC content for Industrial Maintenance Coatings expected to be promulgated by the U.S. Environmental Protection Agency. In addition, the coatings for the present invention are manufactured with epoxies and inert ceramic powders that are food grade when cured.

The present coating comprises at least one resin, such as epoxy. Another embodiment of the present coating further comprises novolac resin dissolved in 15% acetone by weight of novolac and added in the range of from 3.5% to 10% by weight of said base composition, polyglycol di-epoxide resin added in the range of from 0.7% to 2.7% by weight of said base composition, and silicon dioxide added in the range of from 4% to 50% based on the weight of the base composition.

Prior to application of the coating to a surface, it may be helpful to prepare the surface. For optimal performance, steel surfaces must be prepared to white (NACE-1/SSPC-5) or near white (NACE-2/SSPC-10) finish by abrasive air blast cleaning or the like to achieve an anchor profile of 1 mil to 2½ mils maximum. Aluminum requires only a light blasting or an alanine wash before coating. Polyester, epoxy, and other plastics and composites should be wiped with solvent and slightly roughened for better adherence. For best results the substrates must be clean and free of contaminates.

The base and the catalyst require mixing before use. In the preferred embodiment, the base, Part A, is all solids (resin and inert particles). In the preferred embodiment, the base and the catalyst are distinguishable by their color, so that complete mixing may more easily be determined by visual inspection of the blended colors of the components. For example, the base (Part A) is typically dark gray in color. White pigment may be added to the catalyst. Mixing is complete when there are no more white streaks in the coating composition.

The length of time required for mixing depends on the ambient temperature. Higher temperatures require less mixing time and colder temperatures require longer mixing time. Mechanical mixing means such as a drill fitted with standard mixing blades, a blender fitted with appropriate stirring blades, and the like, may be used to combine the catalyst with the loaded resin to form the base composition. The pot life of the catalyzed coating at 72° F. is approximately 1 hour to 2 hours. The present coating is cured in approximately 3 hours to 4 hours at 72° F.

The coating of the preferred embodiment is very viscous. When applied to a vertical wall, the present coating appears as if it will run or sag down the surface, but it does not. The combination of high adhesion and high viscosity make the present invention ideal for repairing or filling surfaces, particularly vertical surfaces. The present invention may even be applied to an upside down surface, where the coating is underneath a horizontal surface, without dripping or sagging.

For best results, the coatings of the present invention should be applied by a spackle blade or some other appropriate putty application tool.

The finished application of the material appears glossy when wet. It gels at room temperature (72° F.) in approximately 1 hour. Longer gel times occur at colder temperatures and shorter gel times occur at higher than room temperature. An 80% cure is achieved within 4 hours, and full cure is achieved within 12 hours at room temperature. Elevated temperatures produce full cures in shorter times. It is possible to place material into service after 4 hours at room temperature or earlier if the temperature is above 72° F.

Should a more rapid cure be desired, the coatings of the present invention cures in 30 minutes if the temperature is elevated to 150° F.

The adhesion strength of the coating of the present invention is measured to be at least 2,000 psi and impact resistance of at least 90-inch/lbs, which is stronger than one would expect from epoxy alone. The upper limit of the adhesion strength of the present coating is not known although it has been measured as high as 5,000 psi.

The above description is not intended to limit the scope of the invention to that described, since different additives, catalysts and curing processes may be used as experimentation would lead a person of ordinary skill in the art to practice.

What is claimed is:

1. A surface coating for repairing damaged surfaces, the coating comprising:

at least one resin;

inert particles loaded into said resin; and a catalyst; wherein said inert particle loaded resin and said catalyst combine to form a final coating composition having desired performance characteristics, said performance characteristics comprising adhesion strength of at least approximately 2,000 psi and wherein said final coating composition does not run or sag when applied to a substantially vertical surface.

2. The coating of claim 1, wherein said resin comprises Bisphenol F epoxy and said catalyst comprises diethylene triamine.

3. The coating of claim 1, wherein said inert particles comprise ceramic.

4. The coating of claim F, wherein said inert particles comprise ceramic.

5. The coating of claim 1, further comprising at least one solid additive.

6. A surface coating for repairing damaged surfaces, said coating comprising:

at least one resin comprising Bisphenol F epoxy;

inert particles comprising ceramic loaded into said resin; and a catalyst comprising diethylene triamine combined with said inert particle loaded resin to form a final coating composition having desired performance characteristics, said performance characteristics comprising adhesion strength of at least approximately 2,000 psi and wherein said final coating composition does not run or sag when applied to a substantially vertical surface.

* * * * *